Oct. 6, 1931.  E. S. MIX  1,826,564
SAFETY HOOK
Filed Nov. 3, 1930
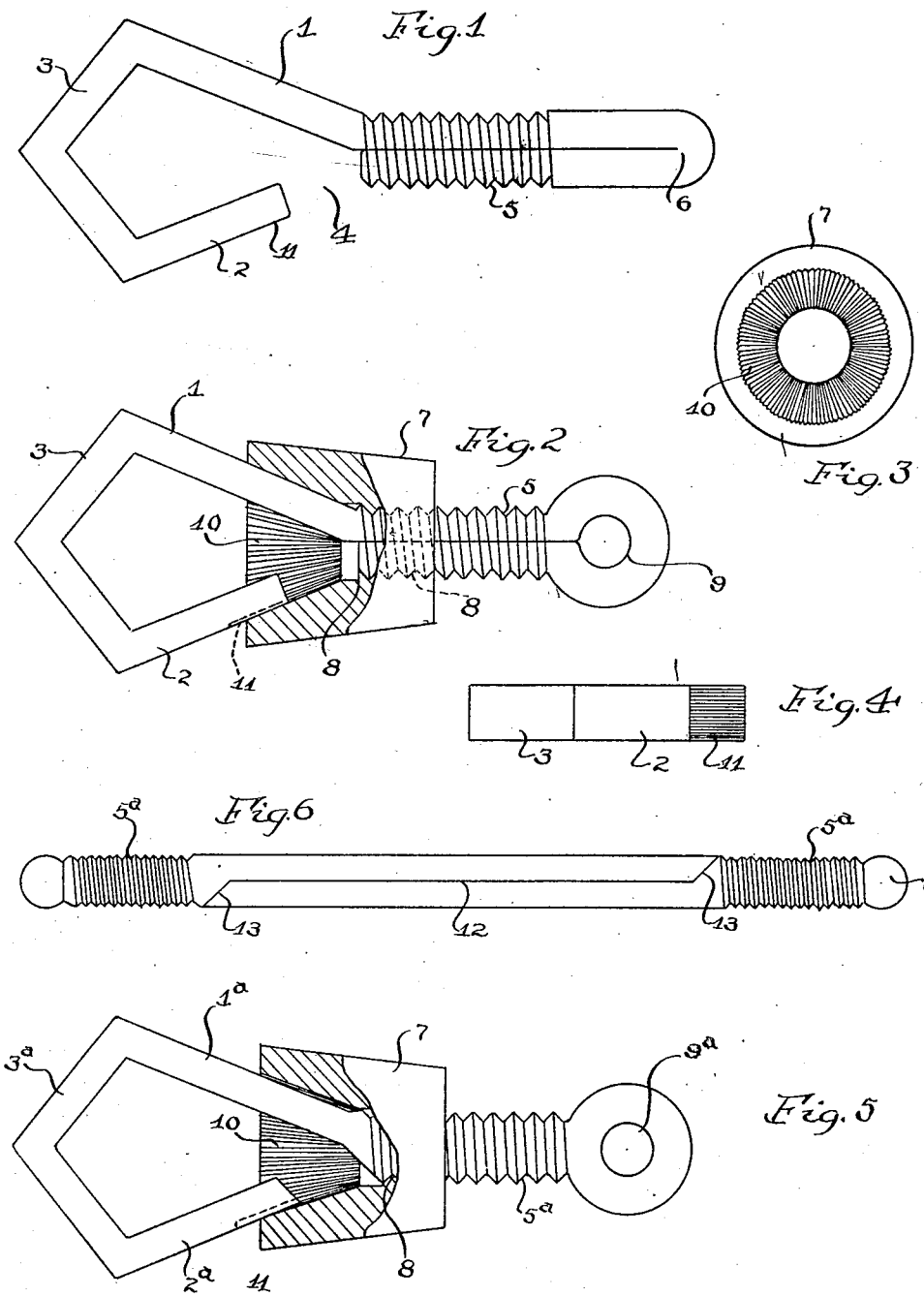
INVENTOR
Edwin S. Mix
BY
His ATTORNEY Patented Oct. 6, 1931

1,826,564

UNITED STATES PATENT OFFICE

EDWIN S. MIX, OF ROCHESTER, NEW YORK, ASSIGNOR TO HICKOK MANUFACTURING COMPANY, INC., OF ROCHESTER, NEW YORK, A CORPORATION OF NEW YORK

SAFETY HOOK

Application filed November 3, 1930. Serial No. 493,066.

The present invention relates to safety hooks and an object thereof is to provide a simple and inexpensive construction which will effectively hold a device to which it is attached.

To these and other ends, the invention consists of certain parts and combinations of parts, all of which will be hereinafter described, the novel features being pointed out in the appended claims.

In the drawings:

Fig. 1 is a side view showing the hook with the guard removed and before the formation of the eye;

Fig. 2 is a view partially in section showing the hook with the guard in guarding position;

Fig. 3 is an end view of the guard;

Fig. 4 is a detail view of the free end of the hook;

Fig. 5 is a side view partially in section of another embodiment of the invention; and Fig. 6 illustrates a method by which the hook shown in Fig. 5 may be made from a strip of round stock.

The embodiment of the invention illustrated in Figs. 1 to 4, is formed from a rod of half round stock which is bent to provide a hook comprising a long arm 1 and a short arm 2 connected by a bend 3, the long and short arms converging and the short arm being spaced from the long arm at the other end to provide a permanently formed throat 4. This stock is also bent in overlapping relation as shown in Fig. 1 so that flat faces of the half round stock abut to provide a shank portion and an eye forming portion the throat 4 being formed between the end of the short arm 2 and the end of the overlapping portions of the stock. Screw threads 5 are formed on the two overlapping portions leading from the inner end of the arm 1 and spaced from the bend 6 between the two overlapping portions.

A guard 7 internally threaded at 8 near one end is fitted on the screw portion 5, after which the metal adjacent the bend 6 is spread and formed into an eye 9 thus holding the guard 7 on the screw threaded shank 5 between the eye and the hook. The guard 7 has its end opposite the internally threaded portion 8 provided with an internal flare 10, the walls of which are formed with serrations. This internally flared portion 10 is adapted to receive the inner end of the arm 1 and the free end of the arm 2 so as to close the throat 4 when the flared portion 10 is projected beyond the screw threaded shank 5 and at the same time to reduce the exposed opening of the hook. The end of this short arm 2 may be provided with serrations 11 and cooperation between the serrations 11 and the serrations on the flared portion 10 tends to lock or hold the guard 7 in guarding position, there being a slight resiliency in the arm 2 which permits it to yield as the arm slips over the serrations on the flared portion 10.

In the embodiment of the invention shown in Figs. 5 and 6, the hook and the shank with the eye are formed from round stock as illustrated in Fig. 6. This stock is cut longitudinally at 12 and also in opposite directions at 13 at opposite ends of the longitudinal cut 12 to provide two hook forming portions of two different devices. The cylindrical portions beyond the cuts 12 are threaded at $5^a$ to provide the shanks for the safety hooks and beyond these two ball portions $6^a$ are provided. The hook forming portions are then bent to form a long arm $1^a$ and a short arm $2^a$ connected by a bend $3^a$. The guard 7 is now fitted on the screw threaded portion, after which the portion $6^a$ is flattened to spread or enlarge the same and the perforation $9^a$ is provided, thus holding the guard against accidental removal between the eye portion and the hook on the externally threaded shank.

In both embodiments of the invention, there is provided a hook having a permanently formed throat between the end of the hook and the shank of the hook. The shank is externally threaded and is engaged by external threads formed near one end of a rotary guard, the other end of the rotary guard having an internally flared portion to receive the free end of the hook and the inner end of the long arm of the hook. Cooperating serrations on the free end of the hook and the flaring wall tend to lock the guard in throat closing position. The eye at the end of the shank opposite the hook is formed after the guard is placed on the shank and holds the guard for operation between the eye and the hook.

What I claim as my invention and desire to secure by Letters Patent is:

1. A hook comprising a threaded shank, an enlarged engaging element at one end of the shank, outwardly divergent arms of different lengths at the opposite end of the shank, the short arm being spaced from the shank to define a throat and the long arm being connected to the shank, a connection uniting the outer divergent ends of the arms, and a guard threaded on the shank and having a flared opening to receive the converging ends of the arms and close the said throat.

2. A hook comprising a threaded shank, an enlarged engaging element at one end of the shank, outwardly divergent arms of different lengths at the opposite end of the shank, the short arm being spaced from the shank to define a throat and the long arm being connected to the shank, a connection uniting the outer divergent ends of the arms, and a guard threaded on the shank and having a flared opening to receive the converging ends of the arms and close the said throat, the opposing faces of the short arm and the flared wall of the guard being serrated to positively interengage to secure the guard against accidental displacement.

3. A hook comprising an elongated blank having an end portion folded upon itself to provide a shank which is threaded, the fold being spread to define an eye, and having the opposite end portion bent to form divergent long and short arms, and a connecting portion uniting the outer ends of the arms, the short arm being spaced from the shank to provide a throat, and a guard threaded upon the shank between the said eye and arms and having a flared opening to receive the converging ends of the arms and close the throat, the opposing faces of the short arm and the flared wall of the guard being serrated to positively interengage to secure the guard against accidental displacement.

EDWIN S. MIX.